United States Patent
Ewert et al.

(10) Patent No.: US 10,293,780 B2
(45) Date of Patent: May 21, 2019

(54) METHOD AND DEVICE FOR OPERATING A PEDESTRIAN-PROTECTION DEVICE OF A VEHICLE, PEDESTRIAN-PROTECTION DEVICE

(71) Applicant: Robert Bosch GmbH, Stuttgart (DE)

(72) Inventors: Marlon Ramon Ewert, Ditzingen-Hirschlanden (DE); Bastian Reckziegel, Kirchheim/Nabern (DE)

(73) Assignee: Robert Bosch GmbH, Stuttgart (DE)

( * ) Notice: Subject to any disclaimer, the term of this patent is extended or adjusted under 35 U.S.C. 154(b) by 166 days.

(21) Appl. No.: 14/900,597

(22) PCT Filed: Jun. 18, 2014

(86) PCT No.: PCT/EP2014/062852
§ 371 (c)(1),
(2) Date: Dec. 21, 2015

(87) PCT Pub. No.: WO2014/206837
PCT Pub. Date: Dec. 31, 2014

(65) Prior Publication Data
US 2016/0152208 A1    Jun. 2, 2016

(30) Foreign Application Priority Data
Jun. 25, 2013  (DE) .......... 10 2013 212 092

(51) Int. Cl.
*B60R 21/34* (2011.01)
*B60R 21/0134* (2006.01)
*B60R 21/0136* (2006.01)

(52) U.S. Cl.
CPC .......... *B60R 21/34* (2013.01); *B60R 21/0134* (2013.01); *B60R 21/0136* (2013.01)

(58) Field of Classification Search
CPC . B60R 21/0136; B60R 21/0134; B60R 21/34; B60R 19/483; B60R 2021/0002;
(Continued)

(56) References Cited

U.S. PATENT DOCUMENTS 5,964,817 A * 10/1999 Dalum ............... B60R 21/0132
                                                                  180/271
6,929,282 B1 * 8/2005 Zoratti ............... B60R 21/0132
                                                                  180/274
(Continued)

FOREIGN PATENT DOCUMENTS

| DE | 198 17 334 C1 | 8/1999 |
| DE | 102 27 003 A1 | 1/2004 |
| DE | 103 46 622 A1 | 5/2005 |

OTHER PUBLICATIONS

International Search Report corresponding to PCT Application No. PCT/EP2014/062852, dated Sep. 3, 2014 (German and English language document) (5 pages).

*Primary Examiner* — Thomas G Black
*Assistant Examiner* — Sze-Hon Kong
(74) *Attorney, Agent, or Firm* — Maginot, Moore & Beck LLP

(57) ABSTRACT

The disclosure relates to a method for operating a pedestrian-protection device of a vehicle, in particular a motor vehicle, which has a surroundings sensor system and a contact sensor system, and is configured to trigger at least one pedestrian-protection measure. The method comprises monitoring the surroundings of the vehicle to detect a collision object using the surroundings sensor system, and determining the type of detected collision object before an impact with the vehicle. The method further comprises using the contact sensor system to determine an impact feature on the vehicle of the detected collision object, which has impacted with the vehicle, and to compare the impact feature (Continued)

with at least one predefineable limiting value, in order to make a decision about the triggering of the pedestrian-protection measure. In this context there is provision that the limiting value is changed as a function of the determined type of detected collision object.

9 Claims, 2 Drawing Sheets

(58) Field of Classification Search
CPC ............. B60R 2021/003; B60R 21/00; B60R 21/0132; B60R 2300/8033; B60W 2550/10; B60W 30/08; B60W 30/095
See application file for complete search history.

(56) References Cited

U.S. PATENT DOCUMENTS

| | | | | |
|---|---|---|---|---|
| 7,920,055 B2* | 4/2011 | Lentes | ................ | B60R 21/0136 180/271 |
| 2005/0114000 A1* | 5/2005 | Cashler | ................ | B60R 21/013 701/45 |
| 2005/0269809 A1* | 12/2005 | Gaukel | ............... | B60R 21/0132 280/735 |
| 2006/0100763 A1* | 5/2006 | Tanabe | ................ | B60R 21/0136 701/45 |
| 2006/0169517 A1* | 8/2006 | Mishra | ................. | B60R 19/205 180/274 |
| 2007/0035113 A1* | 2/2007 | Kuttenberger | ........ | B60R 21/013 280/735 |
| 2007/0045026 A1* | 3/2007 | Theisen | .............. | B60R 21/0136 180/274 |
| 2008/0164986 A1* | 7/2008 | Takafuji | .............. | B60R 21/0136 340/436 |
| 2009/0050394 A1* | 2/2009 | Takahashi | ........... | B60R 21/0134 180/274 |
| 2009/0143987 A1* | 6/2009 | Bect | .................... | B60R 21/0134 701/301 |
| 2009/0205896 A1* | 8/2009 | Mack | ................... | B60R 21/013 180/274 |
| 2010/0063676 A1* | 3/2010 | Ito | ....................... | B60R 21/0134 701/36 |
| 2011/0040452 A1* | 2/2011 | Tsunekawa | ......... | B60R 21/0134 701/45 |
| 2011/0077028 A1* | 3/2011 | Wilkes, III | ........... | B60W 50/14 455/456.3 |
| 2011/0098893 A1* | 4/2011 | Hashimoto | .......... | B60N 2/0276 701/46 |
| 2011/0125372 A1* | 5/2011 | Ito | ....................... | B60R 21/0132 701/45 |
| 2011/0137527 A1* | 6/2011 | Simon | ...................... | B60R 1/00 701/45 |
| 2011/0153164 A1* | 6/2011 | Hiemer | ................. | B60R 21/013 701/45 |
| 2011/0246156 A1* | 10/2011 | Zecha | .................... | G08G 1/166 703/6 |
| 2011/0282538 A1* | 11/2011 | Tamura | .................. | B60R 21/38 701/31.4 |
| 2012/0035812 A1* | 2/2012 | Akaza | ................. | B60R 21/0132 701/46 |
| 2013/0054093 A1* | 2/2013 | Furst | .................... | B60R 21/0132 701/45 |
| 2013/0079995 A1* | 3/2013 | Kula | ..................... | B60R 19/483 701/45 |
| 2013/0184940 A1* | 7/2013 | Stoll | ....................... | B60R 21/01 701/45 |
| 2013/0218419 A1* | 8/2013 | Lind | ..................... | B60R 21/00 701/45 |
| 2013/0253778 A1* | 9/2013 | Park | .................... | B60R 21/0136 701/45 |
| 2014/0000974 A1* | 1/2014 | Nilsson | ................. | B60R 21/015 180/274 |
| 2014/0158450 A1* | 6/2014 | Hasselblad | ............. | B60R 21/38 180/274 |
| 2014/0292502 A1* | 10/2014 | Sakima | ................. | B60W 30/09 340/435 |
| 2014/0324330 A1* | 10/2014 | Minemura | ............. | G08G 1/166 701/301 |
| 2016/0200275 A1* | 7/2016 | Le Merrer | .......... | B60R 21/0134 701/45 |

* cited by examiner

METHOD AND DEVICE FOR OPERATING A PEDESTRIAN-PROTECTION DEVICE OF A VEHICLE, PEDESTRIAN-PROTECTION DEVICE

This application is a 35 U.S.C. § 371 National Stage Application of PCT/EP2014/062852, filed on Jun. 18, 2014, which claims the benefit of priority to Serial No. DE 10 2013 212 092.3, filed on Jun. 25, 2013 in Germany, the disclosures of which are incorporated herein by reference in their entirety.

The disclosure concerns a method for operating a pedestrian-protection device of a vehicle, in particular a motor vehicle, comprising a surroundings sensor and a contact sensor and designed for triggering at least one pedestrian protection measure or pedestrian safety restraint means, wherein by means of the surroundings sensor the surroundings of the vehicle are monitored for a collision object and the type of a detected collision object is determined before a collision with the vehicle, and whereby by means of the contact sensor a feature of the impact on the vehicle of the collision object that is detected and that impacts the vehicle is determined and compared with at least one predeterminable limit value or threshold value in order to decide on triggering the pedestrian protection measure.

The disclosure further concerns a corresponding apparatus as well as a pedestrian-protection device.

BACKGROUND

Methods and apparatuses of the aforementioned type are known from the prior art. In general, contact sensors installed in the bumper of the vehicle are used for the detection of pedestrian accidents. Systems based on two or more acceleration sensors are in wide use. Systems are also known that operate with a pressure tube sensor. In both cases the impact of an object in the relevant region of the bumper results in a signal rise within the detecting sensor. The amplitude of the signal rise is dependent here inter alia on the mass and the speed of the impacting or incident collision object.

From the published patent application DE 103 46 622 A1, moreover, an apparatus of the aforementioned type is known, with which a surroundings sensor is provided that monitors the surroundings of the vehicle and in the event of potential collision objects checks whether this is a pedestrian. The pedestrian protection measures are then triggered depending on whether the collision object is actually a pedestrian. In practice however, it can occur on the one hand that despite widely developed algorithms for checking whether the collision object is a pedestrian, a faulty decision can be made that would result in incorrect triggering of the pedestrian protection measure. On the other hand, it can occur that a pedestrian is not recognized as such, for example as the necessary trigger threshold within the algorithm was not exceeded. This can for example be the case if the pedestrian is a small child or the pedestrian is only partly incident on a relevant region of the bumper. The simple decision as to whether it is a pedestrian or not, and based thereon to decide to trigger pedestrian protection measures, can therefore be insufficient in individual cases.

SUMMARY

The method according to the disclosure has the advantage that incorrect triggering is minimized and the probability of correct pedestrian detection is increased, so that pedestrian protection measures are not triggered unnecessarily and do not remain deactivated in the case of an actual pedestrian collision. The method according to the disclosure is characterized in that the limit value with which the feature of the impact of the collision object is compared is varied depending on the determined type of the detected collision object. According to the disclosure, it is also provided that depending on the detected type of the collision object a decision about the possible triggering or non-triggering of pedestrian protection measures is not taken immediately, but that the limit value ultimately responsible for the triggering is changed in order to provide a more robust or sensitive pedestrian-protection device. A definite decision regarding the triggering of pedestrian protection measures is possible by varying the limit value. The impact energy is preferably determined as a feature of the impact, being the result of a detected acceleration or pressure signal of the contact sensor. Alternatively for example, an impact pressure or an impact force can also be detected as a feature of the impact. Depending on what is used as the feature of the impact, the same is compared with a corresponding limit value or threshold value for the respective feature, wherein the respective limit value is then varied according to the method according to the disclosure.

According to an advantageous development of the disclosure, it is provided that a relative speed of the collision object relative to the vehicle is determined by means of the surroundings sensor. With knowledge of the relative speed of the collision object, further conclusions can be drawn regarding the necessity for the triggering of pedestrian protection measures.

It is in particular provided that a point in time of impact or an impact time window is determined depending on the relative speed. With knowledge of the relative speed of the collision object relative to the vehicle and the position or initial position of the collision object detected by means of the surroundings sensor, it can be determined when the collision object should collide with the vehicle or impact on the vehicle/at the vehicle. The point in time of the impact actually occurring and determined by the monitoring sensor is then preferably compared with the determined point in time of the impact or the determined impact time window. If the actual point in time of impact lies outside of the time window or remote from the determined point in time of impact, it is detected therefrom that the object impacting on the vehicle cannot be the collision object detected by the surroundings sensor.

According to one advantageous development of the disclosure, it is provided that the limit value is only varied at the determined point in time of impact or only within the impact time window. Alternatively, the limit value is only changed at the actual point in time of impact. As a result the pedestrian-protection device is only switched to more sensitive or robust at the determined point in time of impact or in the determined impact time window, in particular if a pedestrian has previously been detected as the type of the collision object. Further types of collision objects can for example be animals, fixed obstacles or objects, such as for example street lamps, garbage bins, parked automobiles, walls or similar. In the case of such non-triggering objects, the limit value is increased or switched to more robust in order to prevent unnecessary triggering of the pedestrian protection measure. As a result of the limit value only being changed at the point in time of impact or in the impact time window, the pedestrian protection measure is for example prevented from being triggered prematurely because of a previously undetected and insignificant collision object that impacts the vehicle before the previously detected collision object, or an object that does not coincide with the actual collision object is prevented from resulting in an influence on the respective limit value or threshold value.

According to an advantageous development of the disclosure, it is provided that in addition a value representing the size of the collision object is determined by means of the surroundings sensor. The size of the collision object or the value is then advantageously taken into account when changing the limit value. With knowledge of the size, moreover, an estimation can be made regarding the mass of the collision object and hence of the feature of the impact to be expected, in particular the energy of the impact to be expected. If for example it is detected that the collision object is a pedestrian of only a small size, i.e. for example a small child, the limit value can for example be reduced to a particularly sensitive value in order to guarantee reliable triggering of the pedestrian protection measure.

According to a preferred development of the disclosure, it is provided that the value representing the size and/or the type of the collision object is compared with the determined feature of the impact, in particular the determined energy of the impact, in order to decide whether the collision is carried out by the collision object. Similarly to what was described above, it is provided according to said embodiment that by the comparison of the determined feature of the impact, in particular the energy of the impact, with the size and/or the type of the collision object and particularly preferably with the feature of the impact to be expected, in particular the expected energy of the impact, the collision object can be verified or plausibility checked in order to prevent incorrect triggering. The prevention of incorrect triggering is in particular also important if the pedestrian protection measure, such as for example an airbag acting externally on the vehicle, can only be set off once. The limit value is preferably only changed if the impacted collision object is recognized as the detected collision object.

It is further preferably provided that a probability of impact of the collision object is determined by means of the surroundings sensor and is taken into account when changing the limit value. If for example there is still sufficient distance to the collision object in order to carry out an avoidance process, the probability of impact can be set to low, whereas in the event of apparently unavoidable collisions the probability of impact is set to high. By said measure, in particular premature or unnecessary switching of the pedestrian-protection device to sensitive by a corresponding change of the limit value is avoided.

It is further preferably provided that if the probability of impact exceeds a predeterminable threshold value, in particular depending on the relative speed of the collision object, the data of the surroundings sensor are stored and are made available for a change of the limit value if the collision object leaves a detection region of the surroundings sensor. By storing the data of the surroundings sensor at the time at which the probability of impact exceeds the predeterminable threshold value, a freeze state is produced during which the surroundings sensor is frozen, so that the data detected by the same is also only available if the collision object leaves a detection region of the surroundings sensor, for example if the collision object passes into a blind region of the surroundings sensor. According to an alternative embodiment of the disclosure, it is provided that the freeze state is set depending on the time TTC to collision (TTC=time to collision), if for example the time to collision is less than or equal to a predeterminable threshold value.

The apparatus according to the disclosure is characterized in that the apparatus changes the limit value depending on the determined type of the collision object. The already mentioned advantages result in this case. The apparatus preferably comprises a correspondingly designed control unit for this that carries out the steps of the method according to the disclosure.

The pedestrian-protection device according to the disclosure is characterized by the apparatus according to the disclosure. The advantages mentioned are obtained as a result of this. The pedestrian-protection device preferably comprises at least one pedestrian protection measure, in particular an airbag that can be disposed externally on the vehicle and/or an engine cowling that can be opened up and that is triggered depending on a comparison of the limit value with the impact feature, in particular the impact energy. The pedestrian-protection device preferably comprises a plurality of pedestrian protection measures that can be triggered independently of each other.

BRIEF DESCRIPTION OF THE DRAWINGS

The disclosure will be described in detail below in the figures. In the figures

DETAILED DESCRIPTION

Figure 1:
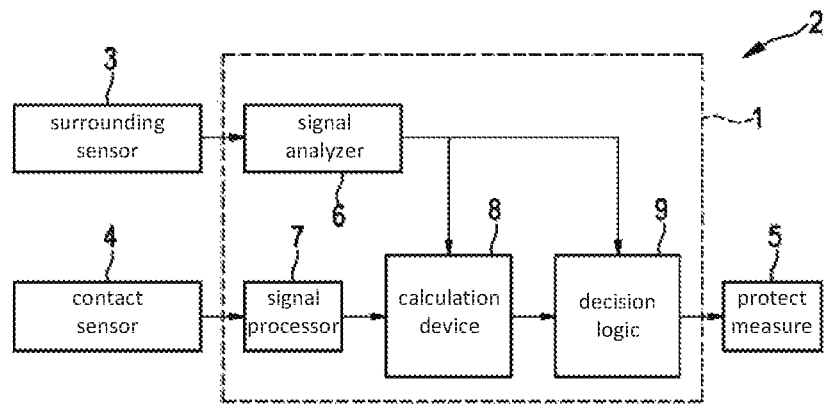
FIG. 1 shows an apparatus for operating a pedestrian-protection device in a schematic representation.

FIG. 1 shows an apparatus for operating a pedestrian-protection device 2 comprising a surroundings sensor 3 and a contact sensor 4. The pedestrian-protection device 2 further comprises at least one pedestrian protection measure 5 that can be activated, such as for example an airbag attached to the outside of the vehicle and/or an engine cowling that can be opened up. In the present case the contact sensor 4 comprises a pressure tube sensor (PTS sensor), which extends along a bumper of the vehicle for example. Alternatively or in addition, it is conceivable that force sensors, light conductors, acceleration sensors, piezo sensors or a combination thereof are provided on the bumper in order to detect the impact of a collision object on the bumper and to determine a feature of the impact, in particular the energy of the impact, of the collision object.

The surroundings sensor 3 preferably comprises a camera system or a radar system that operates for example by ultrasound or laser beam in order to monitor the surroundings of the vehicle and in particular to detect collision objects, i.e. objects in the surroundings of the vehicle, that could collide with the vehicle provided that they are (still) at a distance from the vehicle. It is also conceivable to use a mono camera for this purpose, in particular with object extraction.

The signals of the surroundings sensor 3 are fed to a signal analyzer 6. The signal analyzer 6 determines the type of the collision object using the detected signals of the surroundings sensor 3, i.e. in particular whether the collision object is a pedestrian, a cyclist, a motor cycle, another vehicle, a truck or a stationary obstacle, such as for example a wall. Furthermore, the signal analyzer determines the size of the collision object, which for example gives an indication regarding the mass of the collision object and the collision energy associated therewith that is to be expected. Further, the signal analyzer 6 determines the relative speed of the detected collision object in relation to the vehicle comprising the pedestrian-protection device 2. Depending on the relative speed, the signal analyzer determines the time to collision TTC and an impact time window, in which the collision of the collision object is to be expected. Moreover, the signal processing device 6 determines the so-called probability of a crash or probability of an impact, i.e. the level of the probability of an actual impact of the detected collision object on the vehicle.

The signals of the contact sensor 4 are fed to a signal processing device 7 that analyzes the impact data of the collision object on the vehicle after or while the collision object impacts the vehicle. Using the processed signals from the signal processing device 7, so-called features or impact features are calculated in the next step in a feature calculation device 8. Filtered signals, window integrals, integrals, derivatives and other features are involved in this for example. The calculated features are compared within decision logic 9 with threshold values or limit values. A triggering decision for the pedestrian protection measures 5 is made based on exceeding the threshold values or limit values. The results produced by the signal analyzer 6 are fed to the feature calculation device 8 and the decision logic 9 and are taken into account there during the calculation of the features or during the decision-making for triggering the pedestrian protection measures, as described in detail below.

The features determined by the feature calculation device 8 are fed to the decision logic 9, in which the features are compared with the aforementioned limit values in order to decide whether the pedestrian protection measure 5 should be triggered or not. If the detected collision object is a pedestrian or at least if the dimensions of the collision object coincide with a pedestrian, then at least one limit value that is compared with the detected collision energy is set within the decision logic 9 to be more sensitive or is reduced to a lower value. Using the relative speed of the collision object in relation to the vehicle, the impact window AF or the TTC is determined. The impact window AF is selected depending on the speed for this, in particular depending on the speed of the vehicle and particularly preferably depending on the relative speed of the collision object. The limit value is only changed within said time window in order to adapt the same to the detected collision object, as illustrated in FIG. 2 by way of example.

Figure 2:
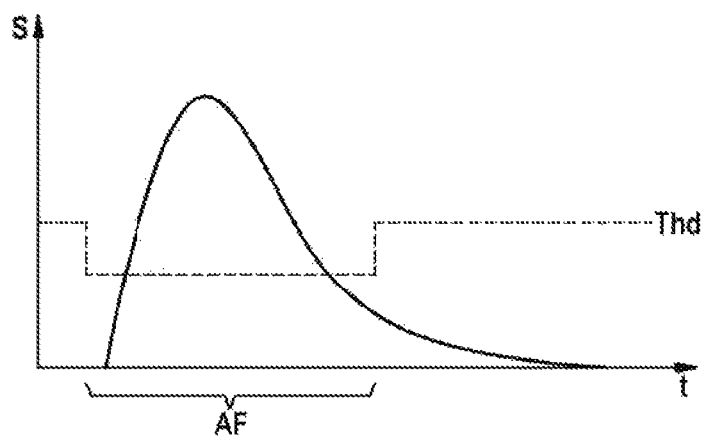
FIG. 2 shows the variation of a limit value of the pedestrian-protection device and FIG. 3 shows the time profile of the change of the limit value depending on a probability of a crash and an impact window.

FIG. 2 shows as an exemplary embodiment the signal profile 10 of the pressure tube sensor representing the impact energy during the impact of a pedestrian against time t. The limit value Thd for the collision energy is plotted in a dashed form in the diagram. Alternatively, a different feature of the impact could also be plotted here and compared with a corresponding limit value.

By limiting the variation of the limit value Thd to the critical time region for the collision, incorrect triggering is avoided because of a different previously unnoticed object for example. The limit value is either changed up or down for this, depending on the type of collision object. The previously determined probability of a crash is preferably also incorporated in the change of the limit value.

Figure 3:
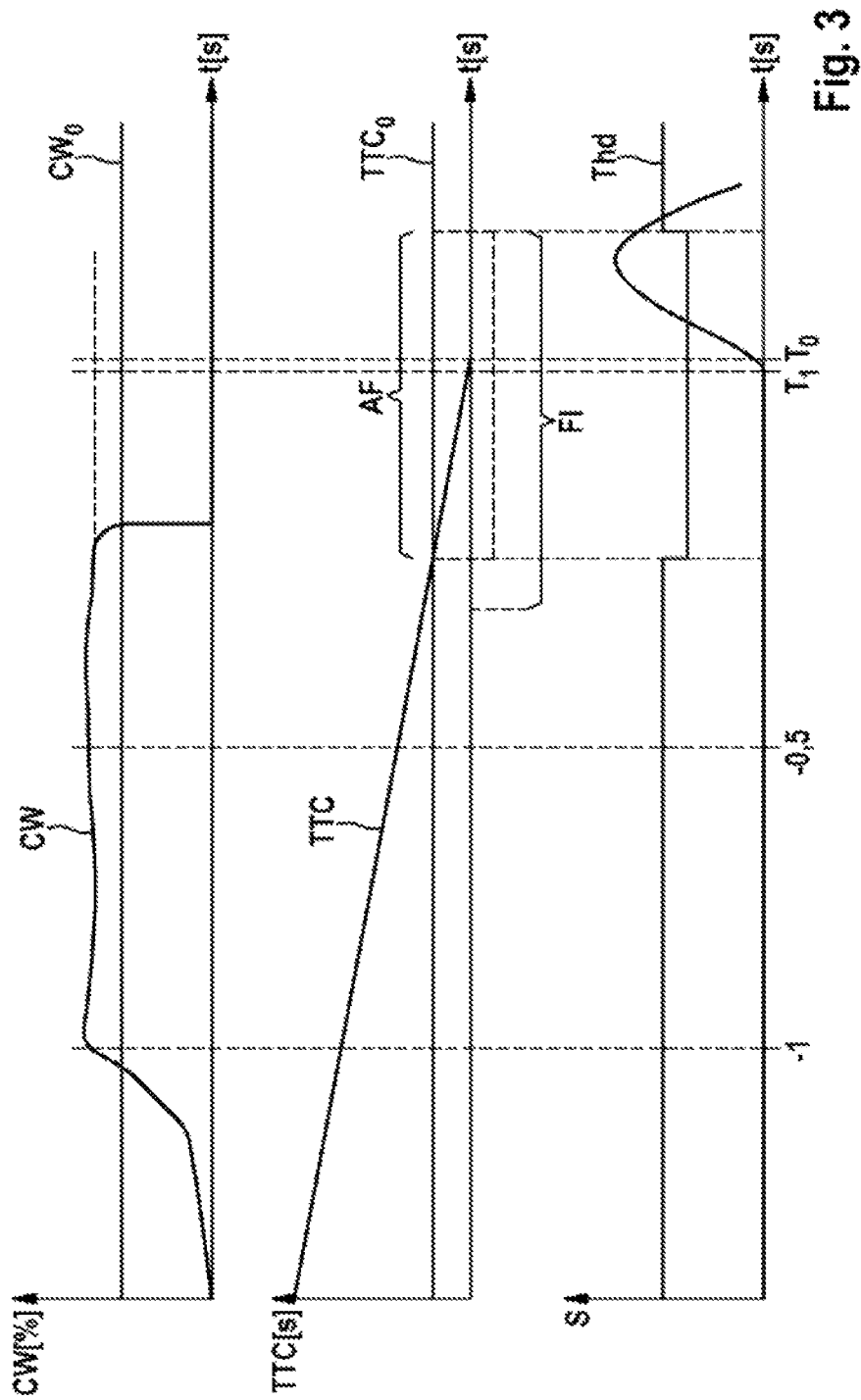

FIG. 3 shows an adaptation of the limit value taking into consideration the theoretical point in time of the impact or the impact time window AF and the probability of a crash against time. In the upper third of the diagram the probability of a crash CW concerning the collision object detected by the surroundings sensor 3 is plotted against time. In addition, a crash probability threshold $CW_0$ is plotted, which lies for example at 60% probability of a crash and can be predetermined depending on the type of collision object for example.

The TTC, or the theoretical time to collision, is plotted against time in the center third. At the point in time $T_0$ at which the TTC reaches the value zero, the collision of the collision object with the vehicle occurs as expected.

The limit value Thd is plotted against time in the lower third. In the time window region AF, which is selected such that the expected point in time of impact $T_0$ lies in the middle. Of course however, the impact time window AF can also be selected such that the expected point in time of the collision $T_0$ lies off-center in the impact time window AF. In the present case the limit value Thd has been reduced within the impact time window AF, for example because a pedestrian has been detected as the collision object. The signal E also shown in the lower third represents the impact energy of the impact object impacting on the vehicle, which is determined by means of the contact sensor 4. At the point in time $T_1$ the collision object actually impacts the vehicle within the collision window, whereas the reduced limit value Thd exists, so that the pedestrian-protection device 2 is set to more sensitive by the change of the limit value Thd and triggers the pedestrian protection measure relatively sooner, i.e. at a lower impact energy.

If the probability of a crash CW lies above the CW threshold $CW_0$ and at the same time the TTC falls below a predeterminable TTC threshold $TTC_0$, the data of the surroundings sensor 3 are "frozen". This preferably means that the data are stored and made available for later use. However, it would also be conceivable to carry out the freezing of the data depending on the TTC. The data are preferably stored for the duration of a predeterminable freeze interval FI. The point in time of the freezing of said data is in the present case speed-dependent and should lie outside the blind region of the surroundings sensor 3. As a result of the freezing of the data, the adaptation of the limit value and also of other threshold values can also then still take place if the collision object moves into the blind region of the surroundings sensor 3. If the detected collision object is a pedestrian, then the limit values and thresholds are set to be more sensitive at the point in time of the freezing. On the other hand, if it is a collision object that should not result in the triggering of the pedestrian protection measures, i.e. a non-triggering object, then the thresholds and limit values are raised and the pedestrian protection algorithm is switched to more robust. The duration of the adaptation or change of the limit values and/or thresholds arises from the preferably speed-dependent freeze interval FI of the TTC, which in the present case corresponds to the impact time window. In general it is preferably provided that the impact time window AF is set to be less than or equal to the freeze interval FI for the limit value adaptation or threshold value adaptation. If the freeze interval has ended, then the thresholds/limit values resume their original values. At this point in time the signal or the impact feature of the contact sensor, in particular the detected collision energy, decreases again, but the triggering decision has already decreased so that the resetting of the thresholds or limit values no longer takes into account the further course of the process. An extended threshold value adaptation for the duration of the signal of the contact sensor above a second limit value $Thd_2$ is also conceivable.

Furthermore, in the present case after the impact has finished the detected impact energy is compared with an impact energy determined by the surroundings sensor 3 or to be expected, so that the collision object that has collided can be verified with the collision object to be expected. Depending on the TTC, a comparison of the detected collision object with the collided collision object thus takes place. Triggering of a pedestrian protection measure or a change of the limit value or of the threshold value will only be carried out if the collision object that has collided and that has been detected by the contact sensor is detected within the impact time window AF. If the collision object that has collided does not coincide with the detected collision object, then the triggering of the pedestrian protection measure is preferably not initiated or no adaptation/change of the limit value is carried out. The decision for triggering the pedestrian protection measure will only be enabled or the limit value will only be changed in the subsequent course of the process if the determined feature of the impact matches the expected feature of the impact or the determined impact energy matches or at least essentially matches the expected impact energy. It can thus be checked whether the collision object detected by the surroundings sensor 3 is also the collision object that has collided with the vehicle. It could for example happen that a wall, such as for example a house wall, is detected by the surroundings sensor 3 and the contact sensor 4 already detects a pedestrian collision before the predicted point in time of collision $T_0$, since the pedestrian is standing in front of the wall. In this case the algorithm or the pedestrian-protection device 2 is not switched to be more robust because the impact time window AF of the wall has not yet been reached. Moreover, given the dimensions of the wall, it cannot be a pedestrian. The pedestrian therefore continues to be reliably detected as such by the pedestrian protection algorithm.

The invention claimed is:

1. A method for operating a pedestrian-protection device of a vehicle having a surroundings sensor and a contact sensor and configured to trigger at least one pedestrian protection measure, the method comprising:
monitoring surroundings of the vehicle to detect a collision object using the surroundings sensor;
determining a type of the detected collision object before an impact on the vehicle;
determining a probability of impact of the detected collision object using the surroundings sensor, wherein, in response to the determined probability of impact exceeding a predeterminable threshold value, data of the surroundings sensor is stored and made available for a change of at least one predeterminable limit value;
determining a feature of the impact on the vehicle of the detected collision object after the detected collision object has impacted on the vehicle using the contact sensor;
comparing the feature with the at least one predeterminable limit value in order to make a decision regarding triggering of the at least one pedestrian protection measure; and
changing the at least one predeterminable limit value depending on the determined type of the detected collision object and depending on the determined probability of impact.

2. The method as claimed in claim 1, further comprising:
determining a relative speed of the detected collision object in relation to the vehicle using the surroundings sensor.

3. The method as claimed in claim 2, further comprising:
determining at least one of an expected point in time of impact and an impact time window depending on the determined relative speed.

4. The method as claimed in claim 3, further comprising:
changing the at least one predeterminable limit value only at the expected point in time of impact or only within the impact time window.

5. The method as claimed in claim 3, further comprising:
determining the impact time window such that the expected point in time of impact lies at a center of the impact time window.

6. The method as claimed in claim 1, further comprising:
determining a value representing a size of the detected collision object using the surroundings sensor.

7. The method as claimed in claim 6, further comprising:
comparing at least one of the value representing the size and the type of the detected collision object with the determined feature of the impact in order to decide whether the impact was an impact with the detected the collision object.

8. An apparatus for operating a pedestrian-protection device of a vehicle, comprising:
a surroundings sensor; and
a contact sensor,
wherein the apparatus is configured to monitor surroundings of the vehicle to detect a collision object using the surroundings sensor and to determine a type of the detected collision object,
wherein the apparatus is configured to determine a probability of impact of the detected collision object using the surroundings sensor, wherein, in response to the determined probability of impact exceeding a predeterminable threshold value, data of the surroundings sensor is stored and made available for a change of at least one predeterminable limit value,
wherein the apparatus is further configured to determine a feature of an impact of the detected collision object on the vehicle using the contact sensor and to compare the feature with the at least one predeterminable limit value to make a decision regarding a triggering of at least one pedestrian protection measure of a pedestrian-protection device of the vehicle, and
wherein the apparatus is further configured to change the predeterminable limit value depending on the determined type of the detected collision object and depending on the determined probability of impact.

9. A pedestrian-protection device for a vehicle comprising:
at least one triggerable pedestrian protection measure; and
an apparatus for operating the pedestrian-protection device including a surrounding sensor and a contact sensor,
wherein the apparatus is configured to monitor surroundings of the vehicle to detect a collision object using the surroundings sensor and to determine a type of the detected collision object,
wherein the apparatus is configured to determine a probability of impact of the detected collision object using the surroundings sensor, wherein, in response to the determined probability of impact exceeding a predeterminable threshold value, data of the surroundings sensor is stored and made available for a change of at least one predeterminable limit value,
wherein the apparatus is further configured to determine a feature of an impact of the detected collision object on the vehicle using the contact sensor and to compare the feature with the at least one predeterminable limit value in order to make a decision regarding a triggering of at least one pedestrian protection measure of a pedestrian-protection device of the vehicle, and wherein the apparatus is further configured to change the predeterminable limit value depending on the determined type of the detected collision object and depending on the determined probability of impact.

* * * * *